Patented Aug. 31, 1926.

1,597,811

UNITED STATES PATENT OFFICE.

HIRAM S. LUKENS, OF PHILADELPHIA, PENNSYLVANIA, ASSIGNOR TO SOLIDIFIER CORPORATION, OF PHILADELPHIA, PENNSYLVANIA, A CORPORATION OF DELAWARE.

DOLOMITIC ARTICLES AND METHOD OF MAKING SAME.

No Drawing.    Application filed August 4, 1925.    Serial No. 48,139.

My invention relates to the manufacture of shaped articles from a mixture of magnesium oxide and calcium carbonate, whether such mixture is used alone or with aggregates. The mixture of MgO and $CaCO_3$ may be obtained by mixing the two in the desired proportions, or by the selective calcination of dolomite to convert the $MgCO_3$ content thereof into MgO, without materially affecting the $CaCO_3$ content; or by taking the selectively calcined dolomite and adding MgO (calcined magnesite) or $CaCO_3$ to give the desired ratio of MgO to $CaCO_3$. In either case, I term the material so obtained "plastic calcined dolomite"; and on account of the cheapness of dolomite, I prefer to use the selectively calcined dolomite with or without varying its ingredients artificially, the term being used to include either case.

I have discovered that if the MgO in such a mixture is converted either partially or preferably wholly into $MgCO_3$, the presence of $CaCO_3$ greatly aids in the reaction and makes the process commercially feasible and advantageous.

This carbonation of the MgO content may be carried out in various ways, but is preferably accomplished by subjecting the shaped article containing MgO and $CaCO_3$ mixture whether obtained by selective calcination of dolomite or by artificial mixing or by both; and whether aggregate is used or not, and while the mixture is damp or wet from the presence of water or water vapor, to the action of $CO_2$ gas. The duration of this carbonating step depends upon the materials used, the amount of water present, the pressure used in forming the article. I will now describe some specific examples of carrying out my process, in one of which the MgO content is substantially entirely converted into a carbonate and the other of which it is only partially converted.

A dry mixture of plastic calcined magnesite, 120 mesh silex and 20 to 30 mesh crushed marble was prepared, the ingredients mixed in the following proportions by weight:

|  | Per cent. |
|---|---|
| Plastic calcined magnesite | 15.0 |
| 120 mesh silex | 22.5 |
| 20–30 mesh marble | 62.5 |

Water was added to the above mixture in the proportion of 16.3 cubic centimeters of water to each 100 grams of dry mixture. The whole was thoroughly mixed and introduced into ordinary tensile briquette molds such as are commonly used in cement testing.

The molds with their contents were then subjected to the action of carbon dioxide gas at atmospheric pressure at a temperature averaging 20° C. At the conclusion of 96 hours' exposure to the action of the gas, three briquettes were removed, heated to constant weight at 100° C. and pulled. They showed an average tensile strength of 156 pounds per square inch.

After six days' exposure to the action of the gas, three more briquettes were removed, heated to constant weight at 100° C. and pulled. These showed an average tensile strength of 373 pounds per square inch.

After eight days' exposure to the action of carbon dioxide gas, three more briquettes were removed, heated to constant weight at 100° C. and pulled. These briquettes showed an average tensile strength of 408 pounds per square inch.

Examination of other briquettes indicated that after eight days' exposure to the action of the gas, little or no additional carbon dioxide was absorbed by the material.

In using the "plastic calcined dolomite", whether natural or artificial, it is preferably ground to the fineness of ordinary commercial plastic calcined magnesite, in order to give a bond of maximum strength. At this degree of fineness, the $CaCO_3$ content functions in a way similar to that of the finely ground silex now used, with similarly ground MgO in making stucco, tile, flooring, etc., and at the same time the $CaCO_3$ aids in the carbonating of the MgO, as above stated.

The reason for the increased carbonation of the MgO in the presence of $CaCO_3$ is not known to me at present. The $CaCO_3$ may exert a catalytic action upon the reaction, but whatever its rationale may be, the presence of $CaCO_3$ does definitely and materially increase the speed and effectiveness of the reaction.

The material may be cast in molds, or spread in place or pressed in dies, and the $CO_2$ treatment may be applied either before or after removal from the mold or dies when such are used. The articles thus formed are dolomitic in character, since they contain the carbonates of both calcium and magnesium. They possess considerable structural strength, are water and fire resistant. They also possess good di-electric properties, especially when suitable aggregates are used therewith. When used for dielectric purposes, the dielectric strength may vary by using aggregates of suitable dielectric properties. By varying such aggregates and their state of fineness, the dielectric properties may be varied as desired. For high resistance, aggregates of high resisting properties are used, while for permitting passage of current better conductors may be used for the aggregate.

The carbonating step may be carried out by a carbonated water or by passing $CO_2$ through water in which the article is immersed.

Where the plastic calcined dolomite is used as a binder, the aggregate may be either organic or inorganic, and may be used in any desired state of subdivision. Other ways of converting the MgO content, either partially or wholly into carbonate, may be employed, and other changes may be made without departing from my invention, since I consider myself the first to carbonate the MgO of a mixture containing $CaCO_3$.

I claim:—

1. In the manufacture of composition articles, the process consisting in carbonating MgO to convert it into a binder while accelerating said reaction by the presence of $CaCO_3$ in admixture therewith.

2. In the manufacture of composition articles, the steps consisting of mixing MgO and $CaCO_3$ with an aggregate, and carbonating at least a part of the MgO to convert it into a binder while accelerating said reaction by the presence of the $CaCO_3$ admixed therewith.

3. In the manufacture of composition articles, the process consisting of carbonating MgO to convert it into a binder while accelerating said reaction by the presence of $CaCO_3$ in moistened admixture therewith.

4. In the manufacture of composition articles, the process consisting of making a wet mixture of selectively calcined dolomite containing MgO and $CaCO_3$, shaping the same, and carbonating the MgO to convert it into a binder while accelerating said reaction by the presence of the $CaCO_3$ in admixture therewith.

5. In the manufacture of composition articles, the process consisting of adding MgO to selectively calcined dolomite containing MgO and $CaCO_3$, preparing a moistened mixture thereof, and then carbonating the MgO to convert it into a binder while accelerating said reaction by the presence of the $CaCO_3$ admixed therewith.

6. As a new article of manufacture, artificial stone comprising a pulverulent aggregate other than ores of metals and containing a material proportion of calcium carbonate, said aggregate being cemented together by a binder, substantially all of which consists of magnesium carbonate chemically formed in place from magnesium oxide in admixture with the calcium carbonate in a wet plastic mixture of the aggregate and binder, said stone having the strength generally required in building materials.

7. As a new article of manufacture, artificial stone formed with a wet mixture of a selectively calcined dolomite containing MgO and $CaCO_3$ and containing $MgCO_3$ chemically formed from the MgO in place in the presence of the admixed $CaCO_3$, said stone having the strength generally required in building materials.

8. As a new article of manufacture, artificial stone comprising selectively calcined dolomite containing MgO and $CaCO_3$ with an added percentage of MgO in a wet admixture, the MgO being at least partially changed to $MgCO_3$ in the presence of admixed $CaCO_3$, said stone having the strength generally required in building materials.

In testimony whereof I have hereunto set my hand.

HIRAM S. LUKENS.